(12) United States Patent
Green

(10) Patent No.: US 9,627,905 B2
(45) Date of Patent: Apr. 18, 2017

(54) JUMPER CABLE

(71) Applicant: Jesse Green, DeSoto, TX (US)

(72) Inventor: Jesse Green, DeSoto, TX (US)

( * ) Notice: Subject to any disclaimer, the term of this patent is extended or adjusted under 35 U.S.C. 154(b) by 1022 days.

(21) Appl. No.: 13/875,472

(22) Filed: May 2, 2013

(65) Prior Publication Data

US 2013/0293184 A1   Nov. 7, 2013

Related U.S. Application Data

(60) Provisional application No. 61/642,546, filed on May 4, 2012.

(51) Int. Cl.
*H02J 7/00* (2006.01)
*H01R 24/58* (2011.01)
*H01R 103/00* (2006.01)

(52) U.S. Cl.
CPC ............ *H02J 7/0054* (2013.01); *H01R 24/58* (2013.01); *H01R 2103/00* (2013.01)

(58) Field of Classification Search
CPC .................................................... H02J 7/0034
USPC ......................................................... 320/105
See application file for complete search history.

(56) References Cited

U.S. PATENT DOCUMENTS

| | | | | |
|---|---|---|---|---|
| 5,083,076 A * | 1/1992 | Scott | ..................... | H01M 10/46 320/105 |
| 6,756,764 B2 * | 6/2004 | Smith | ..................... | F02N 11/14 320/105 |
| 6,759,833 B1 * | 7/2004 | Chen | ..................... | H01M 2/342 320/105 |
| 6,803,743 B2 * | 10/2004 | George | ................. | H02J 7/0034 320/105 |
| 7,279,866 B2 * | 10/2007 | Cheung | ................. | H02J 7/0054 320/105 |
| 2004/0066094 A1 * | 4/2004 | Suzuki | ..................... | H02J 3/38 307/18 |
| 2006/0176011 A1 * | 8/2006 | Liu | ..................... | H02J 7/0034 320/105 |

* cited by examiner

*Primary Examiner* — Yalkew Fantu
(74) *Attorney, Agent, or Firm* — Vincent J. Allen; Carstens & Cahoon, LLP

(57) ABSTRACT

A jumper cable includes a receptacle mounted on, near or within a battery casing. The receptacle may include a socket having a pair of circular contacts on the inner circumference thereof electrically connected to battery terminals. The device may also include a cable having a plug on each end configured to mate with the receptacle socket. Such a plug may include a larger-diameter ring for engaging the upper contact and a smaller-diameter ring for engaging the lower contact when the plug is inserted into the socket. Accordingly, if a battery needs recharging, a plug is inserted into the receptacle associated with the dead battery and the opposing plug is inserted into a receptacle associated with a charged battery to establish electrical interconnection therebetween. Alternatively, an adapter having a socket and electrical clamps for grasping battery terminals may be used when a receptacle is not connected to one of the batteries.

18 Claims, 4 Drawing Sheets

JUMPER CABLE

PRIORITY CLAIM

The present disclosure claims priority to and is a conversion of U.S. Provisional Patent Application No. 61/642,546, entitled "Improved Jumper Cable" and filed May 4, 2013, the entirety of which is incorporated by reference for all purposes.

TECHNICAL FIELD

The present disclosure relates generally to jumper cables, and more specifically to a jumper cable that eliminates connection errors when charging or boosting a battery.

BACKGROUND

Typically, a driver interconnects jumper cables with a dead battery and a charged battery until the dead battery can restart the engine. Each end of the jumper cables includes a pair of clamps, one of which is fastened to either the positive or negative terminal on one of the batteries. Although the clamps are color-coded according to polarity, they may be easily connected to the wrong terminal, which can deplete either battery and cause a short-circuit, an explosion, a blown fuse and other major electrical problems. Furthermore, the clamps are cumbersome to attach and may require the removal of terminal covers or adjacent parts.

Accordingly, there is currently a need for a device that prevents improper connection of jumper cables. The present invention addresses this need by providing a jumper cable having a uniquely-designed plug that is inserted into a mating receptacle on a battery to eliminate polarity errors when recharging a battery.

SUMMARY

The present invention relates to an improved jumper cable comprising a receptacle adapted to be mounted on a battery casing or another nearby location. The receptacle includes a socket having a pair of spaced circular contacts on the inner circumference thereof that are electrically connected to a pair of battery terminals. The device also includes an interface cable having a plug at each of two opposing ends that is configured to mate with the receptacle socket. The plug includes a larger-diameter ring for engaging the upper contact and a smaller-diameter ring for engaging the lower contact when the plug is properly inserted into the socket. Accordingly, if a battery needs recharging, a plug is inserted into the receptacle socket associated with the dead battery and the opposing plug is inserted into a socket associated with a charged battery to establish electrical interconnection therebetween.

It is therefore an object of the present invention to provide a jumper cable system that eliminates polarity errors when recharging a battery.

It is another object of the present invention to provide a jumper cable system that can be quickly and easily connected to a pair of batteries.

In one embodiment, a jumper cable system for providing electricity from one battery to another may comprise a cable having two electrical conductors therethrough and having two ends. In such an embodiment, the system may further comprise two plugs, each located on an end of the cable, and each plug configured to receive an end of the cable and the conductors. Each plug may comprise an extension having two male electrical terminals electrically coupled to the corresponding two conductors, wherein the male electrical conductors each comprise conductive rings, where one of the conductive rings has a smaller diameter than the other conductive ring. Such an exemplary jumper cable system may also comprise a receptacle configured to be electrically coupled to a battery. In exemplary embodiments, the receptacle may comprise two electrical conductors electrically connected to corresponding polarity poles of the battery, as well as a socket for receiving the extension of the plug. Moreover, the receptacle may also comprise two female electrical terminals electrically connected and corresponding to the electrical conductors of the receptacle. In exemplary embodiments, the female terminals each comprise conductive rings corresponding to, and configured to engage, the conductive rings comprising the male terminals when the extension is properly inserted into the socket.

Other objects, features, and advantages of the present invention will become readily apparent from the following detailed description of the preferred embodiment when considered with the attached drawings and the appended claims.

BRIEF DESCRIPTION OF THE DRAWINGS

Embodiments are illustrated by way of example in the accompanying figures, in which like reference numbers indicate similar parts, and in which.

DETAILED DESCRIPTION

Figure 1:
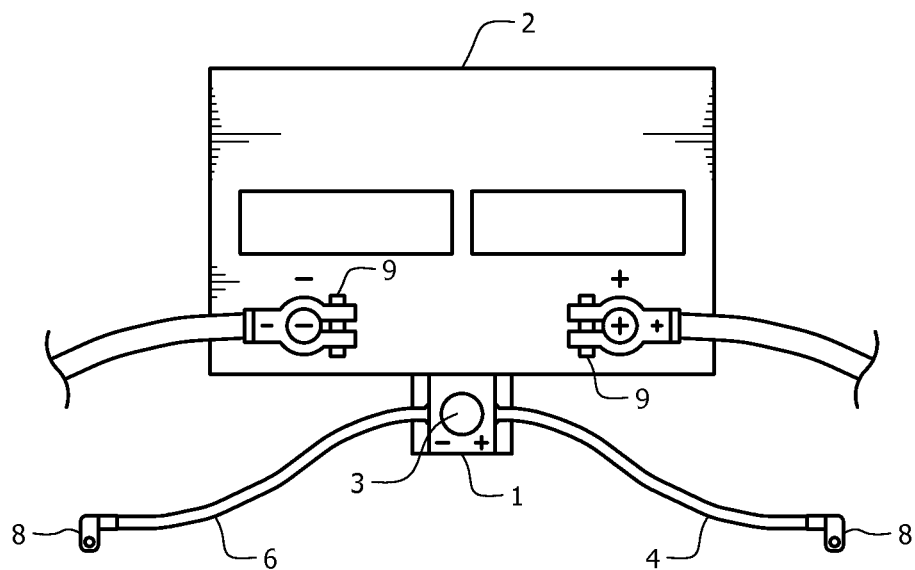
FIG. 1 illustrates a top view of one embodiment of a vehicle battery having a receptacle in accordance with the disclosed principles attached thereto.

The present disclosure relates to an improved jumper cable that eliminates connection errors when charging or boosting a battery, such as a vehicle battery. Looking first at FIG. 1, illustrated is a top view of one embodiment of a vehicle battery having a receptacle in accordance with the disclosed principles attached thereto. Specifically, in this exemplary embodiment, a receptacle in accordance with the disclosed principles 1 may be adapted to be mounted on a vehicle battery casing 2 or another nearby location. Depending on the embodiment, the receptacle 1 may be mounted on or near the battery using screws or an adhesive materials, as desired. In other embodiments, the receptacle may be integrated into the battery casing 2 or even the battery itself, and thus provided from the battery manufacturer.

Figure 3:
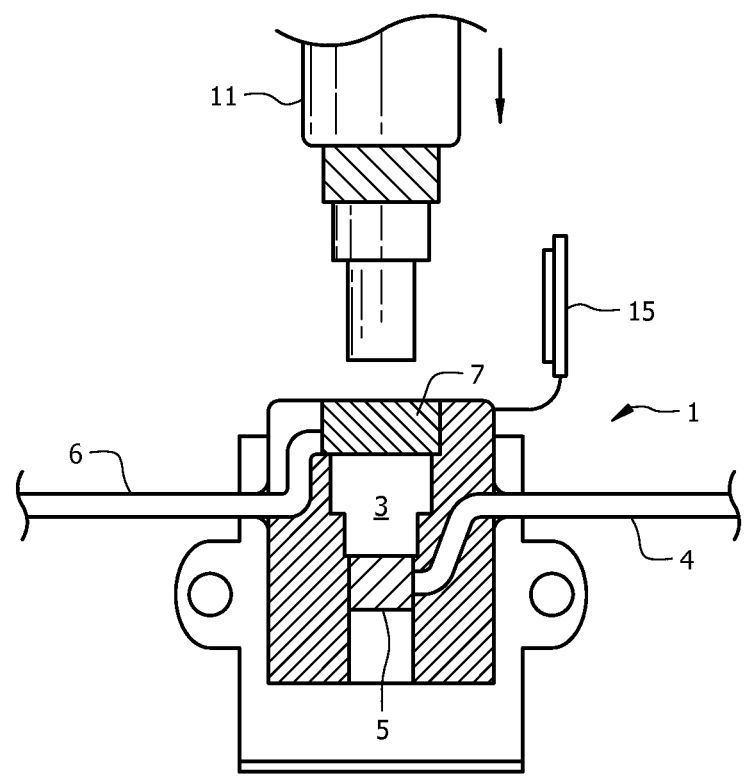
FIG. 3 illustrates a sectional view of the receptacle illustrated in FIG. 1.

The receptacle 1 in the illustrated embodiment includes a socket 3 having a pair of spaced circular contacts on the inner circumference thereof, which are shown in detail in FIG. 3. A first wire 4 extends from and is electrically connected to a lower contact 5 of the receptacle 1 on one end, and is electrically coupled to the positive terminal of the battery on its other end. Similarly, a second wire 6 extends from and is electrically connected to an upper contact 7 of the receptacle 1 on one end, and is electrically coupled to the negative battery terminal on its other end. Each wire 4, 6 preferably includes a fitting 8 that is attached to the terminal clamp bolt 9 connected to the positive and negative terminals of the battery. Of course, other techniques for electrically connecting the wires 4, 6 to the positive and negative terminals of the battery may also be employed.

Figure 2:
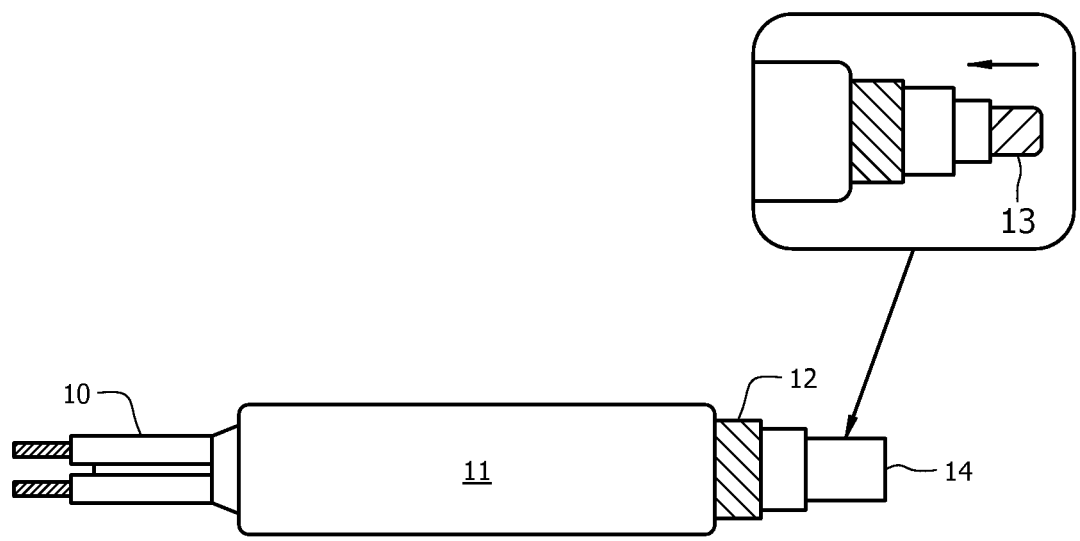
FIG. 2 illustrates a side view of one embodiment of a plug in accordance with the disclosed principles.

Turning now to FIG. 2, illustrated is a side view of one embodiment of a plug 11 in accordance with the disclosed principles. Coupled to the plug 11 and extending therefrom is an interface cable 10 for establishing electrical communication between two batteries. In exemplary embodiments, the cable 10 for use with a plug 11 in accordance with the disclosed principles includes two conductors, one for positive polarity and one for negative polarity. The arrangement of the conductors within the cable may vary depending on the embodiment. For example, in the illustrated embodiment, the conductors are positioned in a side-by-side arrangement inside the cable 10. Of course, the disclosed principle are broad enough to encompass any type of arrangement of the conductors within the cable 10, such as the coaxial arrangement disclosed in FIG. 5.

In addition, the conductors within the cable 10 may be constructed of any advantageously conductive material. For example, they may be constructed of copper, aluminum, or even gold or gold-plated if the application and conduction carried by the cable 10 calls for it. Moreover, although only two conductors are illustrated, expanded uses of the disclosed principles beyond two terminal direct current (DC) applications would encompass more than three conductors in the cable 10. For example, in three-phase alternating current (AC) electrical applications, four conductors could be included in the cable 10. In such embodiments, the disclosed principles would provide an electrical plug that would assist in connecting three-phase electrical equipment without risk of misconnections.

As mentioned above, the cable 10 is connected to, and typically passes through at least a portion of, the plug 11. The opposing end of the plug 11 is configured to mate with the receptacle 1 socket 3 introduced above and discussed in greater detail with reference to FIG. 3. In the illustrated embodiment, the plug 11 includes a larger-diameter conductive ring 12 for electrically engaging the upper contact 7 (shown in FIG. 3) of the receptacle 1, and a smaller-diameter ring 13 for electrically engaging the lower contact 5 (also shown in FIG. 3) of the receptacle 1 whenever the plug 11 is properly inserted into the socket of the receptacle 1. The conductors of the cable 10 pass through at least a portion of the plug 11 body, and are electrically connected, respectively, to the larger- and smaller-diameter conductive rings 12, 13. The conductors of the cable 10 may be so-connected using soldering, or other type of welding, or any type of mechanical electrical connector. Also as illustrated, the plug 11 may include support for strengthening the connection of the cable 10 to the plug 11, in order to resist removal of the cable 10 from the plug 11 or the conductors within the cable 10 from the their connections with the conductive rings 12, 13.

A shroud 14 may also be include to encapsulate the smaller-diameter ring 13 in order to prevent inadvertent engagement with the upper contact 7 when the plug 11 is being inserted and removed to and from the receptacle 1. Moreover, such a shroud 14 substantially encloses the inner smaller-diameter ring 13 such that as the plug 11 is maneuvered around conductive equipment near the receptacle 1, the user will not inadvertently electrically contact the smaller-ring 13 to any other conductive equipment. Advantageously, the shroud 14 may be spring-biased so that the smaller-diameter ring 13 of the plug 11 is automatically protected as the plug 11 is removed from a receptacle 1. Additionally, the socket 3 of the receptacle 1 may be protected by a removable cap 15 that prevents debris and moisture accumulation therein when the receptacle 1 does not include the plug 11 therein.

Looking now at FIG. 3, illustrated is a sectional view of the receptacle 1 illustrated in FIG. 1 and constructed in accordance with the disclosed principles. As illustrated, the receptacle 1 includes a socket 3 for receiving a plug 11 also constructed in accordance with the disclosed principles. The removable cap 15 for covering the socket 3 opening when not in use may also be seen. In this embodiment, within the socket 3 are two electrical connectors or rings 5, 7. Each of these connectors 5, 7 is respectively coupled to wires 4, 6, which as described above are electrically connected to the electrical terminals of the battery. As the plug 11 is properly inserted into the socket 3, the larger-diameter ring 12 will electrically contact the upper contact 7, while the smaller-diameter ring 13 will electrically contact the lower contact 5.

Figure 4:
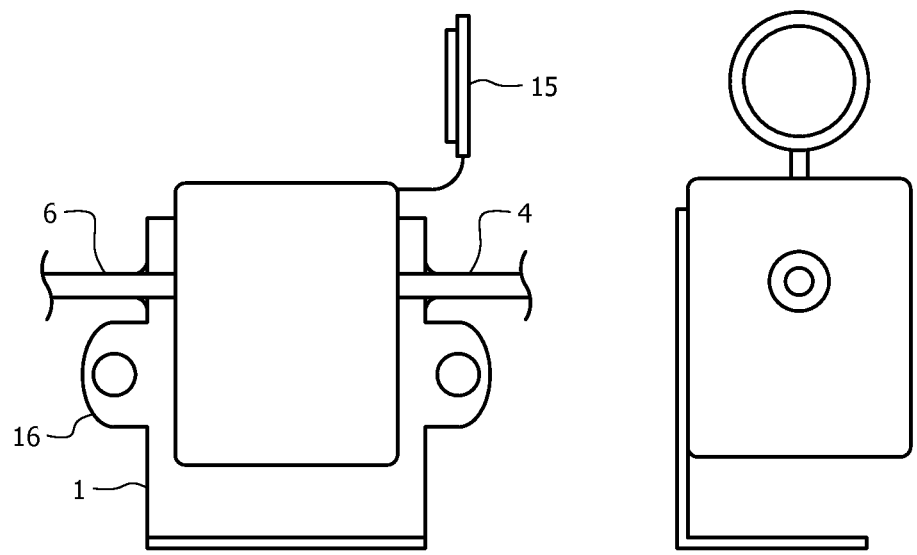
FIG. 4 illustrates front and side views of the receptacle illustrated in FIG. 3.

Referring now to FIG. 4, illustrated are front (left image) and side (right image) views of the receptacle illustrated in FIG. 3. The external views shown in FIG. 4 illustrate the first and second wires 4, 6 extending from the receptacle 1, as well as the removable cap 15 used to cover the socket 3 when not in use. Also as illustrated, the receptacle 1 may include a mounting bracket 16 for bolting (or otherwise mounting) receptacle 1 to a location preferably, but not necessarily, near the battery. For example, the receptacle 1 disclosed herein may be mounted at a location on vehicle that is distal from the battery, yet perhaps more easily accessible by user. For example, the receptacle 1 could be mounted in the cabin of a vehicle, or perhaps proximate the front bumper of the vehicle. Such mounting locations may allow use of the disclosed receptacle 1 and plug 11 without having to obtain direct access to the battery, such as in vehicles or equipment where the battery is located in an inconvenient location to access. Remote mounting may also be beneficial for vehicles or equipment needing continuous electrical connection to the battery to maintain full charge on the battery until used, such as vehicles that are rarely driven.

Figure 5:
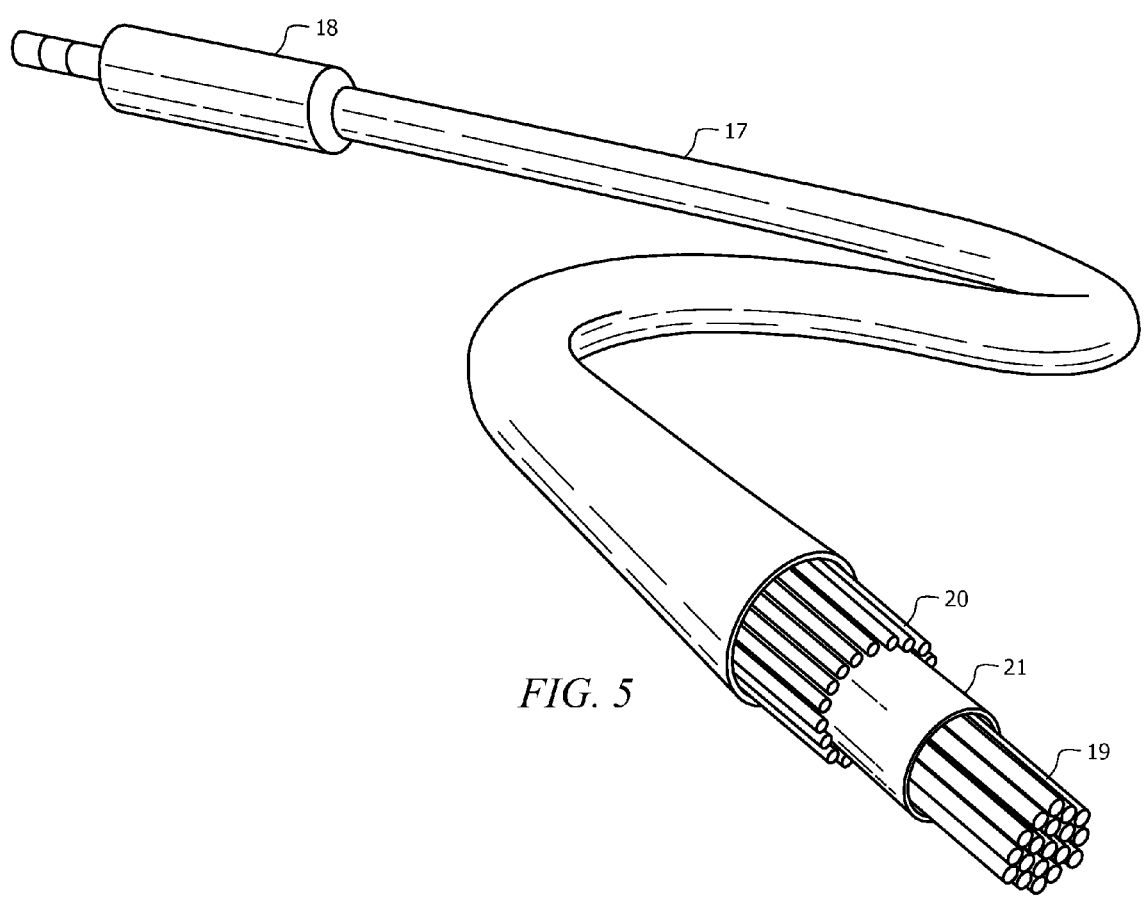
FIG. 5 illustrates an isometric view of one embodiment of a coaxial cable in accordance with the disclosed principles.

Turning now to FIG. 5, illustrated is an isometric view of one embodiment of a coaxial cable 17 constructed in accordance with the disclosed principles. In this embodiment, the coaxial cable 17 is again connected to plug 18, which in accordance with the disclosed principles is configured to fit within a unique receptacle (not illustrated). With a coaxial configuration, the cable 17 includes an inner conductor 19 and an outer conductor 20, wherein the conductors are separated by an insulator 21. Although the conductors 19, 20 are illustrated as annular, it should be noted that one or both of the conductors may be only partially annular, and thus the outer conductor 20 would only partially encircle the inner conductor 19.

Furthermore, a coaxial cable 17 constructed in accordance with the disclosed principles may include more than two conductors 19, 20. For example, if three conductors where included in the coaxial cable 17, the resulting triaxial construction (as opposed to the biaxial construction illustrated in FIG. 5) would include a third conductor encircling both of the conductors 19, 20 illustrated in FIG. 5. Of course, as before, any number of conductors may be includes and arranged in a coaxial configuration. Moreover, in other embodiments, only some conductors within the cable could be in a coaxial arrangement, while still other conductors may be arranged alongside the coaxial conductors.

Figure 6:
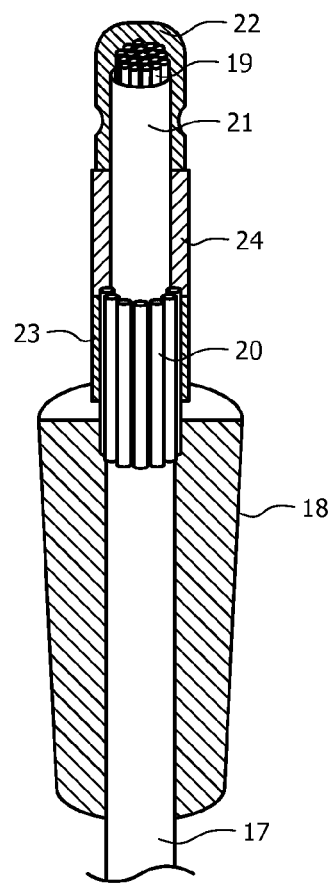
FIG. 6 illustrates a sectional view of another embodiment of a plug in accordance with the disclosed principles for use with the coaxial cable illustrated in FIG. 5.

Looking now at FIG. 6, illustrated is a sectional view of another embodiment of a plug 18 constructed in accordance with the disclosed principles. Specifically, the plug shown in FIG. 6 is configured for use with the coaxial cable 17, such as the type of coaxial cable 17 illustrated in FIG. 5. In this embodiment of a plug 18, the inner conductor 19 and outer conductor 20 of the coaxial cable 17 may be seen extending through the body of the plug 18. In addition, the inner conductor 19 is configured to electrically connect to a first terminal 22 of the plug 18, while the outer conductor 20 is configured to electrically connect to a second terminal 23 of the plug. The first and second terminals 22, 23 may be separated from each other by an insulator 24, as well. As in other embodiments, the conductors 19, 20 may be electrically coupled to the first and second terminals 22, 23 using any of a number of techniques, including welding and mechanically-based electrical couplers.

Figure 7:
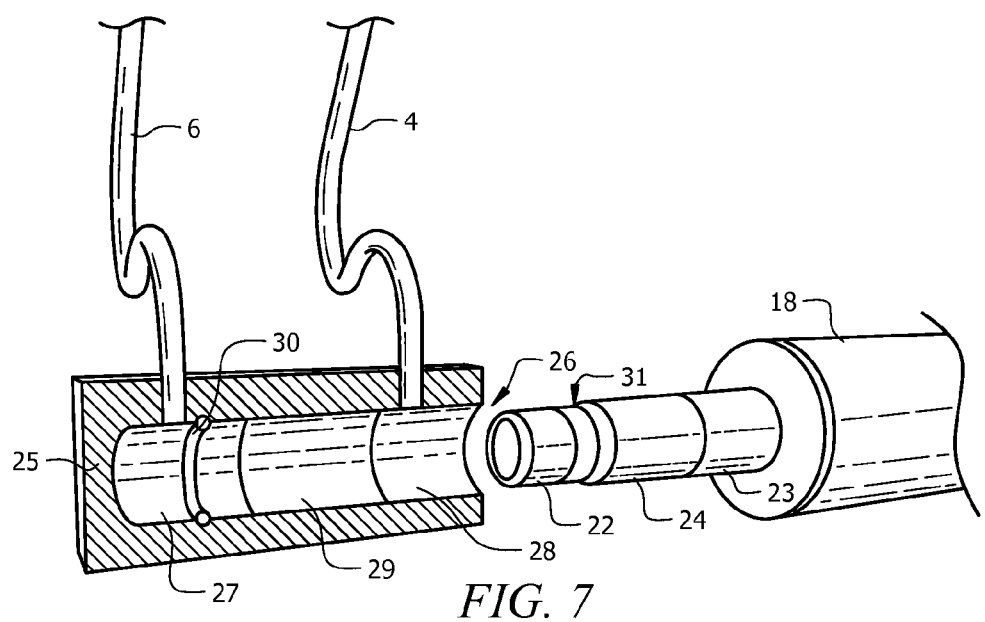
FIG. 7 illustrates a perspective view of one embodiment of a receptacle in accordance with the disclosed principles and configured for receiving the plug illustrated in FIG. 6.

Turning finally to FIG. 7, illustrated is a perspective, partially sectional view of another embodiment of a receptacle 25 in accordance with the disclosed principles and configured for receiving the plug 18 illustrated in FIG. 6. This embodiment of a receptacle 25 constructed in accordance with the disclosed principles again includes wires 4, 6 configured to be electrically connected to the corresponding terminals of a battery. Also as before, the receptacle 25 may be located near the battery to which it is connected, or it may be mounted at a remote location.

To receive the plug 18 having the coaxial cable 17, the receptacle 25 includes a socket 26 on one end. Once the extending prong of the plug 18 is inserted into the socket 26, an inner ring 27 is configured to electrically connect with the first terminal 22 of the plug 18, while an outer ring 28 is configured to electrically connect with the second terminal 23 of the plug 18. As illustrated, an insulating ring 29 may also be disposed between the inner and outer rings 27, 28 to electrically isolate the rings 27, 28 from one another. Furthermore, the socket 26 may also include a securing ring 30 therein. The securing ring 30 may be included to help retain the extension portion of the plug 18 within the receptacle 25. Therefore, the plug 18 may include an annular notch 31 corresponding to the location of the securing ring 30 to resist removal of the plug 18 from the socket 26 once the two are properly engaged.

In operation, a jumper cable having a plug and receptacle in accordance with the disclosed principles is attached to each of two batteries. Specifically, the plugs on the ends of the cable are inserted into the receptacles electrically connected to the corresponding batteries in order to provide electrical charge to one of the batteries. Once the dead battery has been sufficiently replenished, the plugs are withdrawn from their corresponding receptacles and the cable may be stored until needed again. Those who are skilled in the art will understand that the above-described devices and related techniques are not limited to the exact details of construction and enumeration of parts provided herein. Furthermore, the size, shape and materials of construction of the various components can be varied. Additionally, in the event that both vehicles are not equipped with a receptacle as disclosed herein, the disclosed principles also provide for a set of battery terminal clamps having their own receptacle. As a result, one end of a cable as disclosed herein may be inserting into the receptacle that is electrically connected to the set of clamps, and then the clamps electrically connected to the electrical/battery terminals of the vehicle or equipment not having an installed receptacle. The clamps may then be used to provide the electrical connection to that vehicle or equipment in the traditional manner, while the plug and receptacle on the other vehicle or equipment are employed as disclosed herein.

While various embodiments in accordance with the principles disclosed herein have been described above, it should be understood that they have been presented by way of example only, and not limitation. Thus, it will be readily apparent to those skilled in the art that modifications may be made thereto which still fall within the breadth and scope of this disclosure, which is defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

I claim:

1. A system for providing electricity from one battery to another, the system comprising:
   a cable having at least two electrical conductors therethrough and having at least two ends;
   at least two plugs, each located on an end of the cable, each plug configured to receive an end of the cable and the conductors, and each plug comprising an extension having at least two male electrical terminals electrically coupled to corresponding ones of the at least two conductors;
   a receptacle configured to be electrically coupled to a battery, the receptacle comprising:
      electrical conductors electrically connected to corresponding polarity poles of the battery,
      a socket for receiving the extension of the plug, and
      at least two female electrical terminals electrically connected to corresponding ones of the electrical conductors of the receptacle, the at least two female terminals corresponding configured to electrically engage corresponding ones of the at least two male terminals when the extension is properly inserted into the socket, wherein the at least two male electrical conductors comprise electrically conductive rings, and one of the at least two conductive rings is located on a distal end of the extension from a body of the plug, and the other of the at least two conductive rings is located at a proximal end of the extension.

2. The system according to claim 1, wherein one of the at least two conductive rings has a smaller diameter than another of the at least two conductive rings.

3. The system according to claim 2, further comprising a moveable protective shroud configured to cover at least a portion of the smaller diameter conductive ring when the plug is not engaged in the socket.

4. The system according to claim 2, wherein the at least two female electrical conductors comprise electrically conductive rings corresponding to the conductive rings comprising the at least male terminals, and wherein one of the at least two conductive rings comprising the female terminals has a smaller diameter than another of the at least two conductive rings comprising the female terminals.

5. The system according to claim 1, wherein the conductors in the cable are arranged parallel to one another.

6. The system according to claim 1, wherein the cable is a coaxial cable and a first conductor therein is annularly positioned at least partially around a second conductor therein.

7. The system according to claim 1, wherein the cable comprises two conductors, and the plug comprises two corresponding conductive terminals.

8. The system according to claim 1, wherein the socket comprises a removable cover configured to cover the socket when the plug is not engaged in the socket.

9. The system according to claim 1, further comprising a mounting bracket engaged with the receptacle and configured to mount the receptacle to a desired location.

10. The system according to claim 9, wherein the mounting bracket is configured to mount the receptacle to the battery.

11. The system according to claim 1, wherein the receptacle is integrally formed with the battery.

12. A system for providing electricity from one battery to another, the system comprising:
a cable having two electrical conductors therethrough and having two ends;
two plugs, each located on an end of the cable, each plug configured to receive an end of the cable and the conductors, and each plug comprising an extension having two male electrical terminals electrically coupled to the corresponding two conductors, wherein the male electrical conductors each comprise conductive rings, one of the conductive rings having a smaller diameter than the other conductive ring and one of the conductive rings is located on a distal end of the extension from a body of the plug, and the other of the conductive rings is located at a proximal end of the extension; and
a receptacle configured to be electrically coupled to a battery, the receptacle comprising:
two electrical conductors electrically connected to corresponding polarity poles of the battery,
a socket for receiving the extension of the plug, and
two female electrical terminals electrically connected and corresponding to the electrical conductors of the receptacle, the female terminals each comprising conductive rings corresponding to, and configured to engage, the conductive rings comprising the male terminals when the extension is properly inserted into the socket.

13. The system according to claim 12, wherein the conductors in the cable are arranged parallel to one another.

14. The system according to claim 12, wherein the cable is a coaxial cable and a first conductor therein is annularly positioned at least partially around a second conductor therein.

15. The system according to claim 12, wherein the cable comprises two conductors, and the plug comprises two corresponding conductive terminals.

16. The system according to claim 12, wherein the socket comprises a removable cover configured to cover the socket when the plug is not engaged in the socket.

17. The system according to claim 12, further comprising a mounting bracket engaged with the receptacle and configured to mount the receptacle to a desired location.

18. The system according to claim 17, wherein the mounting bracket is configured to mount the receptacle to the battery.

* * * * *